UNITED STATES PATENT OFFICE.

ALFRED SELLERS, OF NEW YORK, N. Y.

IMPROVEMENT IN PLATES FOR PRINTING BANK-NOTES, &c.

Specification forming part of Letters Patent No. 41,724, dated February 23, 1864.

*To all whom it may concern:*

Be it known that I, ALFRED SELLERS, of the city, county, and State of New York, have invented a new and useful Improvement in Plates for Bank-Note and other Engraving and Printing; and I do hereby declare that the following is a full, clear, and exact description of the same.

Much of the engraving on bank-note plates is produced by what is called "transferring" impressions from the surfaces of hardened steel rollers, the face of the plate being passed under the roller, or the roller passed over the face of the plate several times back and forth while a heavy pressure is applied. To enable this to be done successfully it is desirable that the face of the plate shall have a mellow softness, and yet the plate requires to be hard and strong enough to resist the heavy pressure. The plates made of fine iron sometimes used are frequently so stretched in the rolling operation that in the successive passages of the rollers the lines of the impression do not come exactly in the same place, and the impression produced is rendered imperfect, and steel plates are so hard that a good transfer is only obtained by many repetitions of the operation of the rollers, and the rollers soon wear out. It has been attempted to decarbonize the faces of steel plates to give them the requisite degree of softness; but this has only been partially successful.

The object of this invention is to obtain plates which have a desirable softness of surface and the requisite hardness or strength of body to resist the heavy pressure to which they are subject; and to this end it consists in combining a layer of steel and a layer of fine iron by welding, casting, or any other suitable method of uniting the iron forming the face and the steel the back of the plate.

The method which I have practiced successfully of carrying out my invention is to take a piece of sheet-iron of the finest quality, of suitable size and thickness, and a piece of sheet-steel of corresponding size and suitable thickness, heat both to a welding-heat and unite them by hammering or rolling; but the combined iron and steel plate may be made by casting or any other suitable means by which a perfect union may be obtained. The combined iron and steel plate thus produced is finished for the engraver's use in the same manner as the steel and iron plates heretofore used.

I am aware that it is common to combine or unite iron and steel for various purposes; but generally, if not in all cases in which such combination has been used, the steel has been used for the face and the iron for the back, which is the reverse of my invention. In view of such combination I however consider it proper to disclaim the invention of a combination of iron and steel, except to produce plates for engraving and printing purposes.

What I claim as my invention, and desire to secure by Letters Patent, is—

The manufacture of plates for engraving and printing purposes, composed of a layer of iron and a layer of steel, combined substantially as herein described, the iron forming the face and the steel the back of the plate, as herein specified.

ALFRED SELLERS.

Witnesses:
D. ROBERTSON,
THOS. S. J. DOUGLAS.